(12) United States Patent
Castillow

(10) Patent No.: US 11,345,199 B2
(45) Date of Patent: May 31, 2022

(54) TOWING ATTACHMENT

(71) Applicant: Joey Castillow, Monroeville, AL (US)

(72) Inventor: Joey Castillow, Monroeville, AL (US)

( * ) Notice: Subject to any disclaimer, the term of this patent is extended or adjusted under 35 U.S.C. 154(b) by 115 days.

(21) Appl. No.: 16/868,513

(22) Filed: May 6, 2020

(65) Prior Publication Data

US 2020/0353781 A1    Nov. 12, 2020

Related U.S. Application Data

(60) Provisional application No. 62/843,979, filed on May 6, 2019.

(51) Int. Cl.
| | |
|---|---|
| *B60D 1/01* | (2006.01) |
| *B60D 1/167* | (2006.01) |
| *B62D 53/08* | (2006.01) |
| *B60P 3/07* | (2006.01) |

(52) U.S. Cl.
CPC ............. *B60D 1/1675* (2013.01); *B60P 3/07* (2013.01); *B62D 53/0842* (2013.01)

(58) Field of Classification Search
CPC ........ B60D 1/1675; B60D 1/015; B60D 1/52; B60P 3/07; B60P 3/125; B62D 53/0842
See application file for complete search history.

(56) References Cited

U.S. PATENT DOCUMENTS

| | | | | |
|---|---|---|---|---|
| 5,465,993 A | * | 11/1995 | Gee ..................... | B60D 1/143 280/475 |
| 9,986,675 B1 | * | 6/2018 | Hellbusch ............. | B60P 3/064 |
| 10,807,425 B1 | * | 10/2020 | Gesto ................... | B60D 1/06 |
| 2005/0111949 A1 | * | 5/2005 | Craze ................... | B60P 3/125 414/563 |
| 2014/0339792 A1 | * | 11/2014 | Schuettenberg ....... | B60D 1/145 280/504 |
| 2016/0082796 A1 | * | 3/2016 | Fincher ................ | B60D 1/1675 280/474 |
| 2018/0319232 A1 | * | 11/2018 | Gentner ................ | B60D 1/02 |
| 2019/0126700 A1 | * | 5/2019 | Belinky ................ | B60D 1/06 |
| 2019/0135060 A1 | * | 5/2019 | Frisz ................... | B60D 1/465 |

* cited by examiner

*Primary Examiner* — Tony H Winner
*Assistant Examiner* — Marlon A Arce

(57) ABSTRACT

A towing attachment is designed to facilitate the towing of bobtail trucks and similar vehicles. The towing attachment includes a tube, a hitch attachment body, a first mounting bracket, a second mounting bracket, a first locking mechanism, and a second locking mechanism. The tube is preferably a rectangular, tubular, structure that receives the first mounting bracket and the second mounting bracket. The hitch attachment body is an assembly that allows attachment onto the hitch feature of a bobtail truck or other similar vehicle. The first mounting bracket and the second mounting bracket allow engagement to a wheel lift of a towing vehicle. The first locking mechanism maintains the first mounting bracket in place along the tube. The second locking mechanism maintains the second mounting bracket in place along the tube.

16 Claims, 7 Drawing Sheets

TOWING ATTACHMENT

The current application claims a priority to the U.S. Provisional Patent application Ser. No. 62/843,979 filed on May 6, 2019.

FIELD OF THE INVENTION

The present invention generally relates to towing and towing accessories. More specifically, the present invention is a towing attachment designed to facilitate the towing of bobtail trucks and similar vehicles.

BACKGROUND OF THE INVENTION

An objective of the present invention is to provide a towing attachment which facilitates the towing of a bobtail truck or similar vehicles. The towing attachment, preferably referred to as Tow Buddy, is a wheel lift attachment for a heavy duty (HD) wrecker to tow a bobtail truck from behind. Furthermore, the present invention can be utilized as a lift point to lift and load a truck. The present invention provides a faster way of hooking up and towing a bobtail truck in a safe, dependable, and efficient manner. The towing attachment can be easily mounted to the wheel lift of a HD wrecker without modifying the structure of the wheel lift. The towing attachment can further be hooked to a bobtail truck by connecting the towing attachment to the fifth wheel plate by engaging a kingpin provided in the towing attachment with the fifth wheel plate. Then, after taking all safety precautions and securing the truck according to local regulations, the wheel lift can be engaged, and the truck can be towed away. In a preferred embodiment of the present invention, the towing attachment comprises a main body, a first bracket, and a second bracket. The first bracket and second bracket can be removably attached to the main body. In some embodiments of the present invention, the main body can further comprise a plate corresponding to a fifth wheel plate so the towing attachment can be utilized to tow a heavy-duty trailer. Furthermore, the towing attachment can be provided with a storage container designed to fit in a wrecker and maintain all grease contained. The towing attachment can be provided in different sizes designed to match different wheel lifts of different shapes and/or sizes.

DETAIL DESCRIPTIONS OF THE INVENTION

Figure 1:
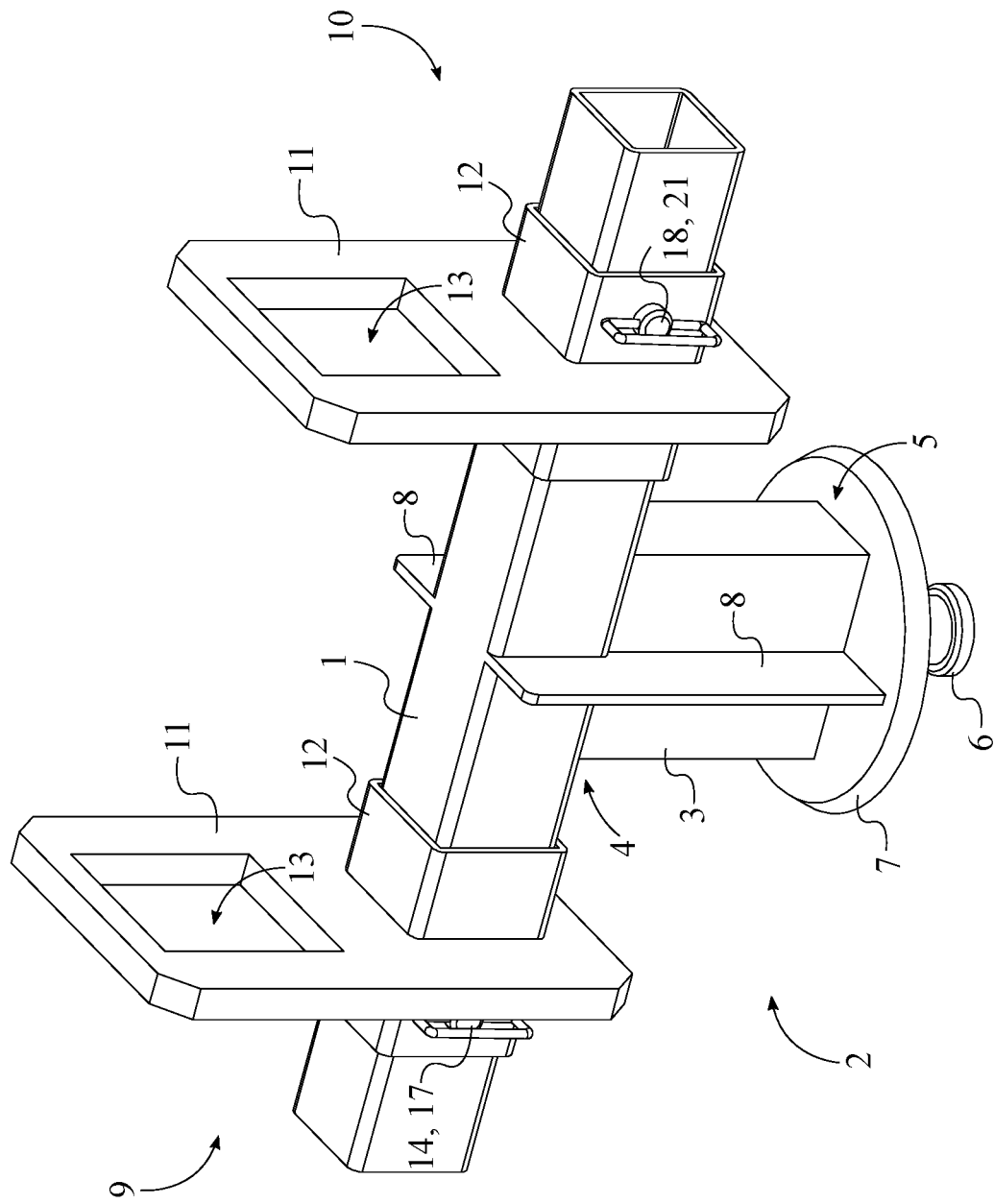
FIG. 1 is a front top perspective view of the present invention.

All illustrations of the drawings are for the purpose of describing selected versions of the present invention and are not intended to limit the scope of the present invention.

In reference to FIGS. 1 through 6, the present invention is a towing attachment designed to facilitate the towing of bobtail trucks and similar vehicles. A preferred embodiment of the present invention comprises a tube 1, a hitch attachment body 2, a first mounting bracket 9, a second mounting bracket 10, a first locking mechanism 14, and a second locking mechanism 18. The tube 1 is preferably a rectangular tubular structure that supports the first mounting bracket 9 and the second mounting bracket 10. The hitch attachment body 2 is an assembly that allows the present invention to attach onto the hitch feature of a bobtail truck or other similar vehicle. The first mounting bracket 9 and the second mounting bracket 10 allow the present invention to be engaged to a wheel lift of a towing vehicle. The shape and size of the first mounting bracket 9 and the second mounting bracket 10 may vary in order for the present invention to be engaged to different types and sizes of wheel lifts. The first locking mechanism 14 maintains the first mounting bracket 9 in place along the tube 1. The second locking mechanism 18 maintains the second mounting bracket 10 in place along the tube 1.

The general configuration of the aforementioned components allows the present invention to facilitate the towing of bobtail trucks and similar vehicles. With reference to FIG. 1, the hitch attachment body 2 is laterally mounted to the tube 1. In the preferred embodiment of the present invention, the hitch attachment body 2 is permanently connected to the tube 1, wherein the hitch attachment body 2 and the tube 1 form a T-shaped structure. In another embodiment of the present invention, the hitch attachment body 2 is mounted to the tube 1 by a mechanism such as, but not limited to, a pin locking mechanism. The first mounting bracket 9 and the second mounting bracket 10 are laterally mounted to the tube 1 and are positioned offset from each other along the tube 1. This arrangement allows the first mounting bracket 9 and the second mounting bracket 10 to be engaged to each side of the wheel lift of a towing vehicle. The hitch attachment body 2 is positioned in between the first mounting bracket 9 and the second mounting bracket 10. This arrangement allows a wheel lift to optimally tow a bobtail truck or similar vehicle with the present invention by equally distributing the pulling force applied by the hitch attachment body 2 amongst the first mounting bracket 9 and the second mounting bracket 10. Further, the hitch attachment body 2 is oriented away from the first mounting bracket 9 and the second mounting bracket 10 about the tube 1. This arrangement prevents any obstruction when the first mounting bracket 9 and the second mounting bracket 10 are engaged to the wheel lift and when the hitch attachment body 2 is attached onto the hitch feature of a bobtail track or other similar vehicle. The first locking mechanism 14 is operatively coupled in between the first mounting bracket 9 and the tube 1, wherein the first locking mechanism 14 is used to selectively lock the first mounting bracket 9 in place along the tube 1. In further detail, the first locking mechanism 14 prevents the first mounting bracket 9 from sliding along the tube 1, while the present invention is in a functional configuration, but also allows the first mounting bracket 9 to readily dissembled from the tube 1, while the present invention is being placed into storage. Similarly, the second locking mechanism 18 is operatively coupled in between the second mounting bracket 10 and the tube 1, wherein the second locking mechanism 18 is used to selectively lock the second mounting bracket 10 in place along the tube 1. Likewise, the second locking mechanism 18 prevents the second mounting bracket 10 from sliding along the tube 1, while the present invention is in a functional configuration, but also allows the second mounting bracket 10 to be readily disassembled from the tube 1, while the present invention is being placed into storage.

Figure 2:
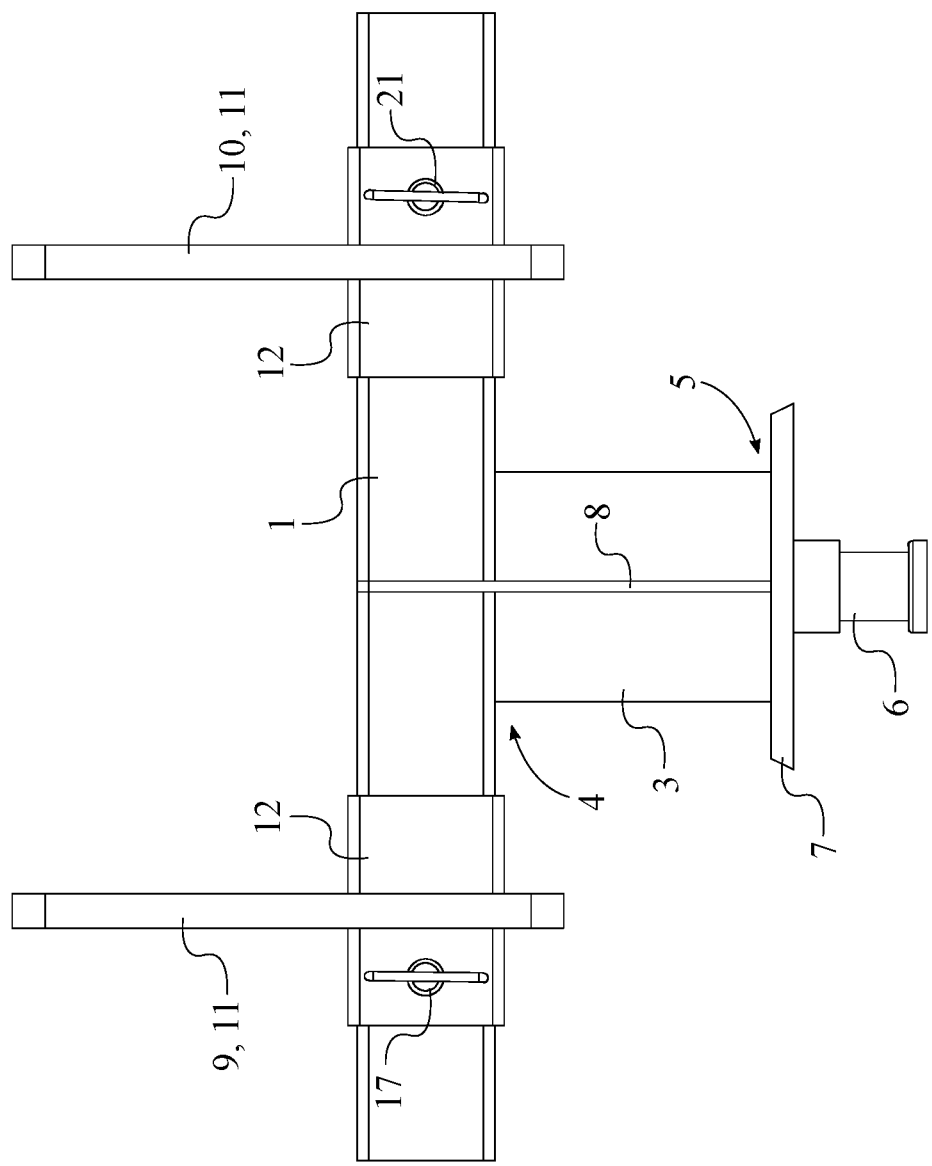
FIG. 2 is a front view of the present invention.
Figure 3:
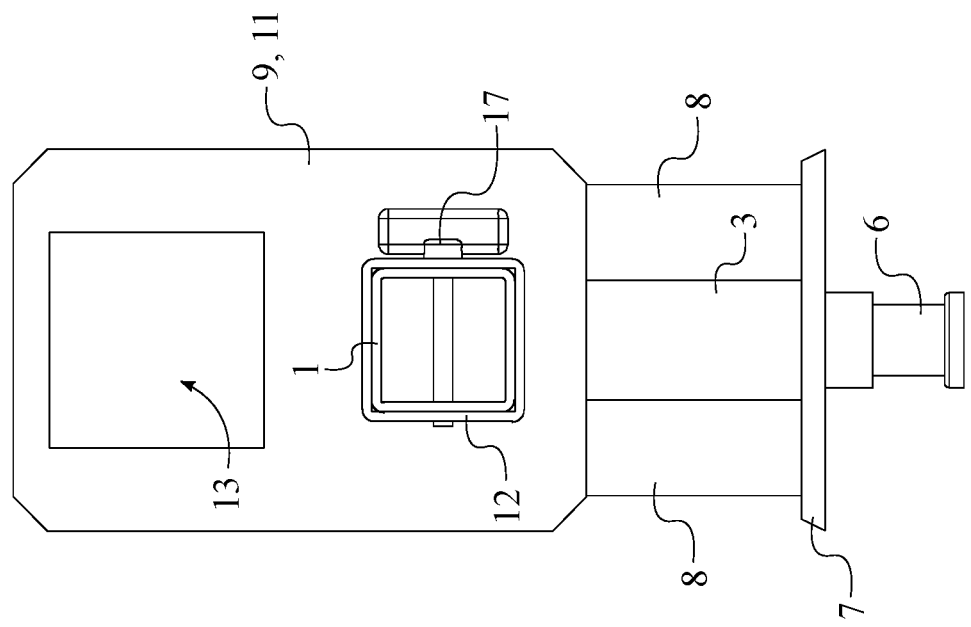
FIG. 3 is a left-side view of the present invention.
Figure 4:
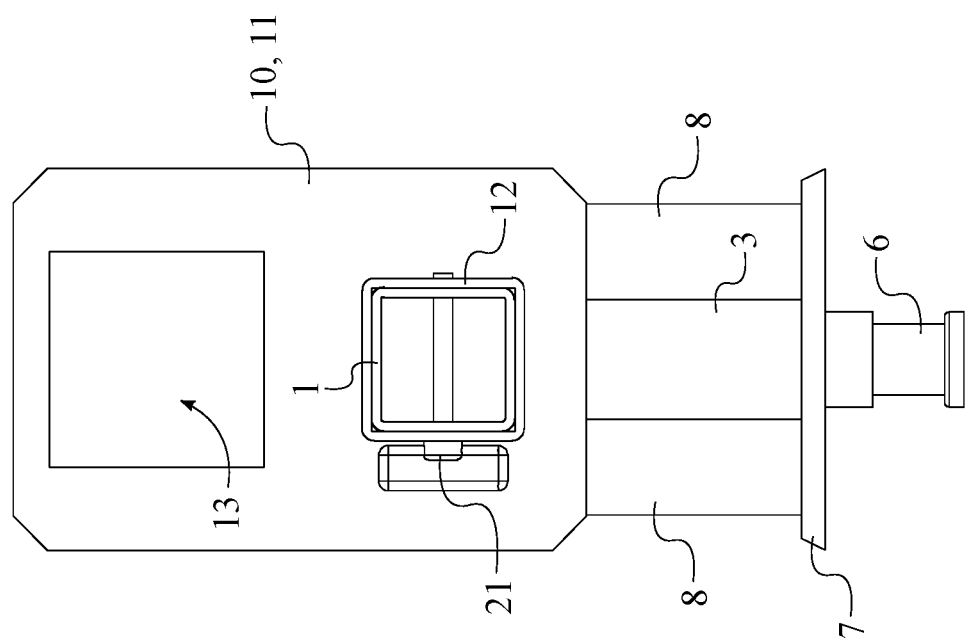
FIG. 4 is a right-side view of the present invention.

In order for the first mounting bracket 9 and the second mounting bracket 10 to be mounted to the tube 1 and to be engaged to a wheel lift and with reference to FIGS. 2 through 4, the first mounting bracket 9 and the second mounting bracket 10 each may further comprise a panel 11, a sleeve 12, and a lift-receiving feature 13. The sleeve 12 allows each the first mounting bracket 9 and the second mounting bracket 10 to be engaged to the tube 1 in a slidably, non-rotational manner. The lift-receiving feature 13 allows each the first mounting bracket 9 and the second mounting bracket 10 to be engaged to a wheel lift. The sleeve 12 and the lift-receiving feature 13 traverse through the panel 11. In further detail, the sleeve 12 is a tubular structure that traverses through the panel 11, and the lift-receiving feature 13 is preferably a cutout of the panel 11. The sleeve 12 and the lift-receiving feature 13 are positioned offset from each other across the panel 11. This arrangement prevents obstruction when the sleeve 12 is slidably mounted along the tube 1 and the lift-receiving feature 13 is engaged to a wheel lift. The sleeve 12 and the lift-receiving feature 13 are positioned normal to the panel 11. This arrangement positions the sleeve 12 for both the first mounting bracket 9 and the second mounting bracket 10 to be effectively engaged to the tube 1, and the lift-receiving feature 13 for both the first mounting bracket 9 and the second mounting bracket 10 to be effectively engaged to the wheel lift. Further, the tube 1 is slidably mounted within the sleeve 12. Thus, the the first mounting bracket 9 and the second mounting bracket 10 are respectively secured to the tube 1 in a functional configuration by its sleeve 12. Moreover, the lift-receiving feature 13 of the first mounting bracket 9 and the lift-receiving feature 13 of the second mounting bracket 10 are concentrically positioned to each other in order for the first mounting bracket 9 and the second mounting bracket 10 to be effectively engaged to both sides of the wheel lift.

Figure 5:
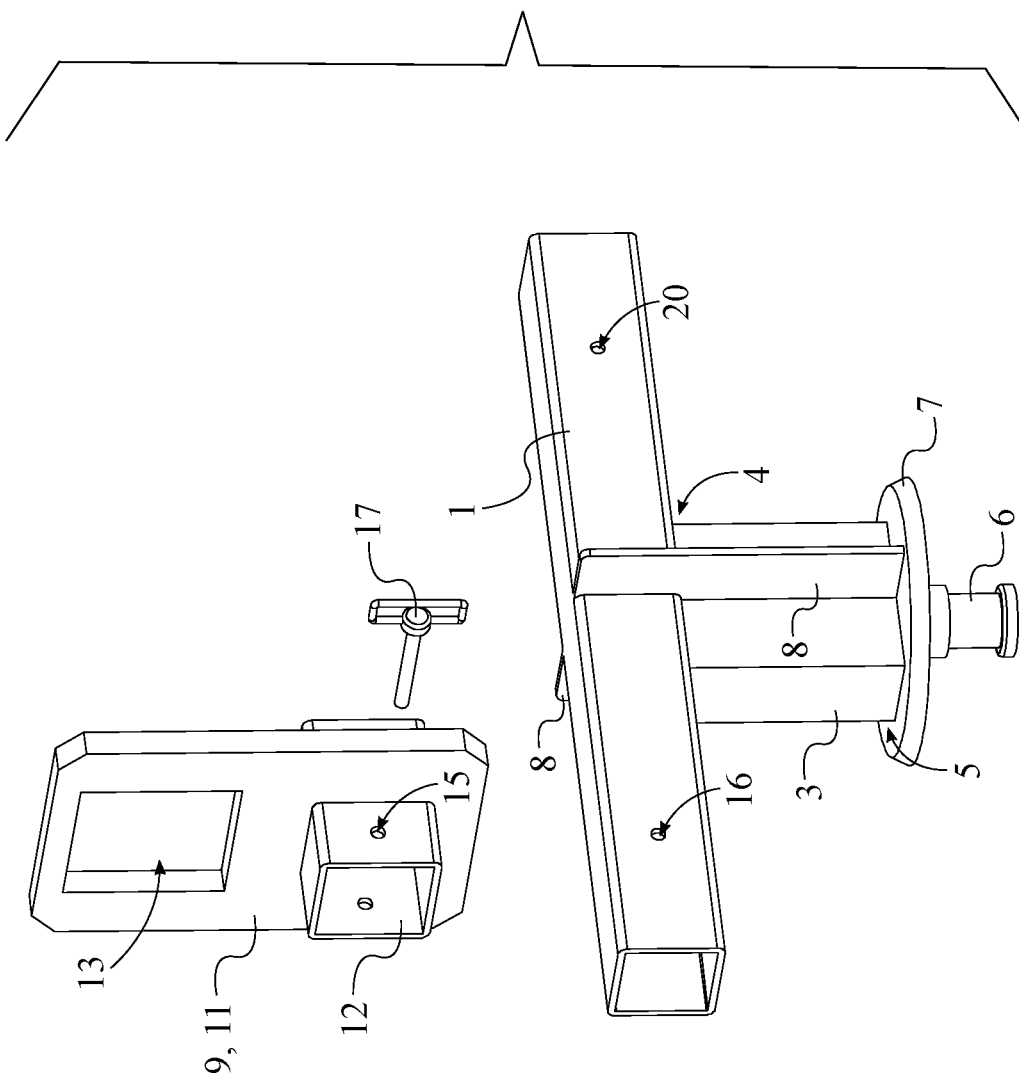
FIG. 5 is an exploded top left-side perspective view of the present invention.

In order for the first locking mechanism 14 to lock the first mounting bracket 9 in place along the tube 1 and with reference to FIG. 5, the first locking mechanism 14 may further comprise a first bracket hole 15, a first tube hole 16, and a first pin 17. The first bracket hole 15 laterally traverses through the sleeve 12 of the first mounting bracket 9. This arrangement allows the sleeve 12 of the first mounting bracket 9 to receive the first pin 17. The first tube hole 16 laterally traverses through the tube 1. This arrangement allows one end of the tube 1 to receive the first pin 17. Further, the first bracket hole 15 is concentrically positioned to the first tube hole 16 in order for the first pin 17 to pass through both the sleeve 12 of the first mounting bracket 9 and the tube 1. Moreover, the first tube hole 16 and the first bracket hole 15 are engaged by the first pin 17. Thus, the first mounting bracket 9 is locked in place along the tube 1 by the first locking mechanism 14.

Figure 6:
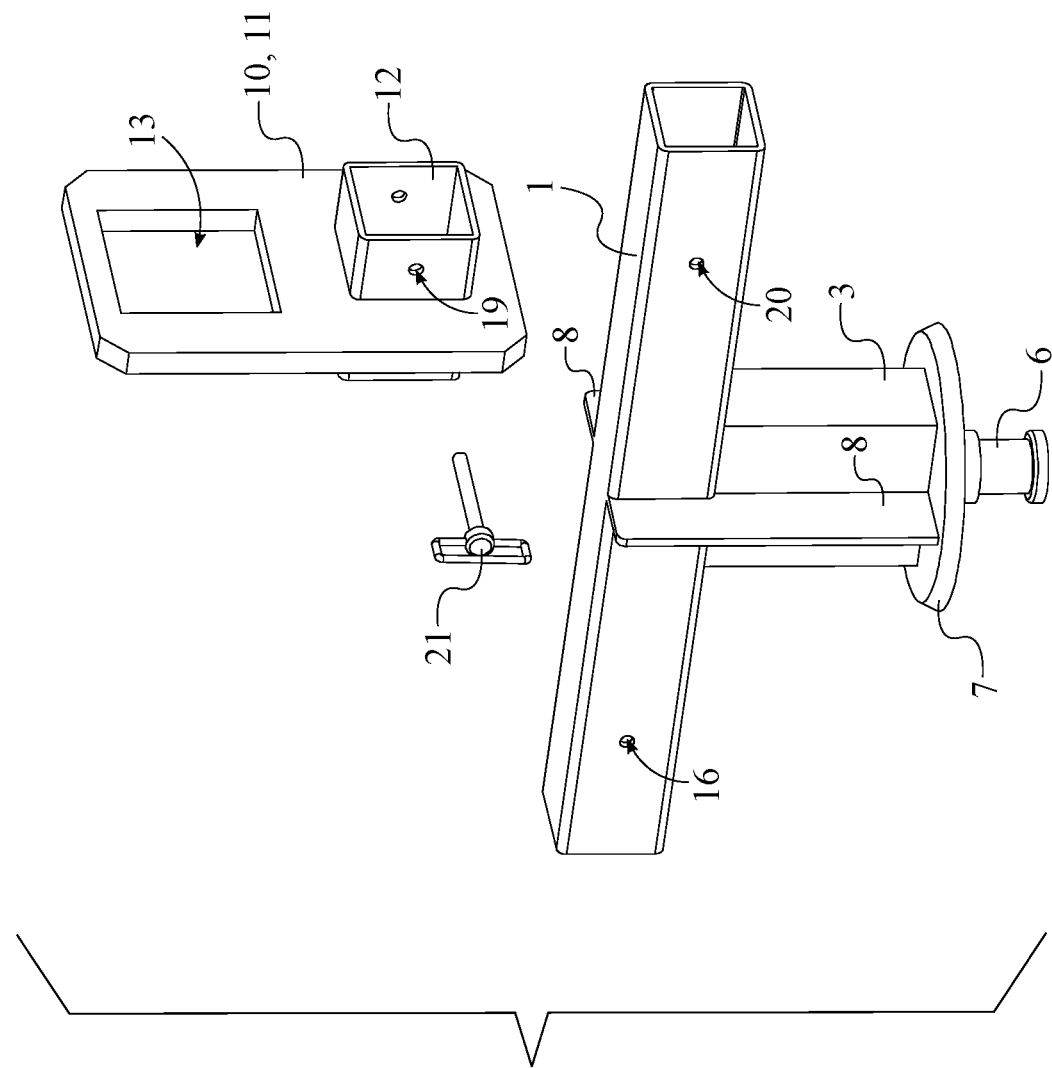
FIG. 6 is an exploded top right-side perspective view of the present invention.

Similarly, in order for the second locking mechanism 18 to lock the second mounting bracket 10 in place along the tube 1 and with reference to FIG. 6, the second locking mechanism 18 may further comprise a second bracket hole 19, a second tube hole 20, and a second pin 21. The second bracket hole 19 laterally traverses through the sleeve 12 of the second mounting bracket 10. This arrangement allows the sleeve 12 of the second mounting bracket 10 to receive the second pin 21. The second tube hole 20 laterally traverses through the tube 1. This arrangement allows the other end of the tube 1 to receive the second pin 21. Further, the second bracket hole 19 is concentrically positioned to the second tube hole 20 in order for the second pin 21 to pass through both sleeve 12 of the second mounting bracket 10 and the tube 1. Moreover, the second tube hole 20 and the second bracket hole 19 are engaged by the second pin 21. Thus, the second mounting bracket 10 is locked in place along the tube 1 by the second locking mechanism 18.

Figure 7:
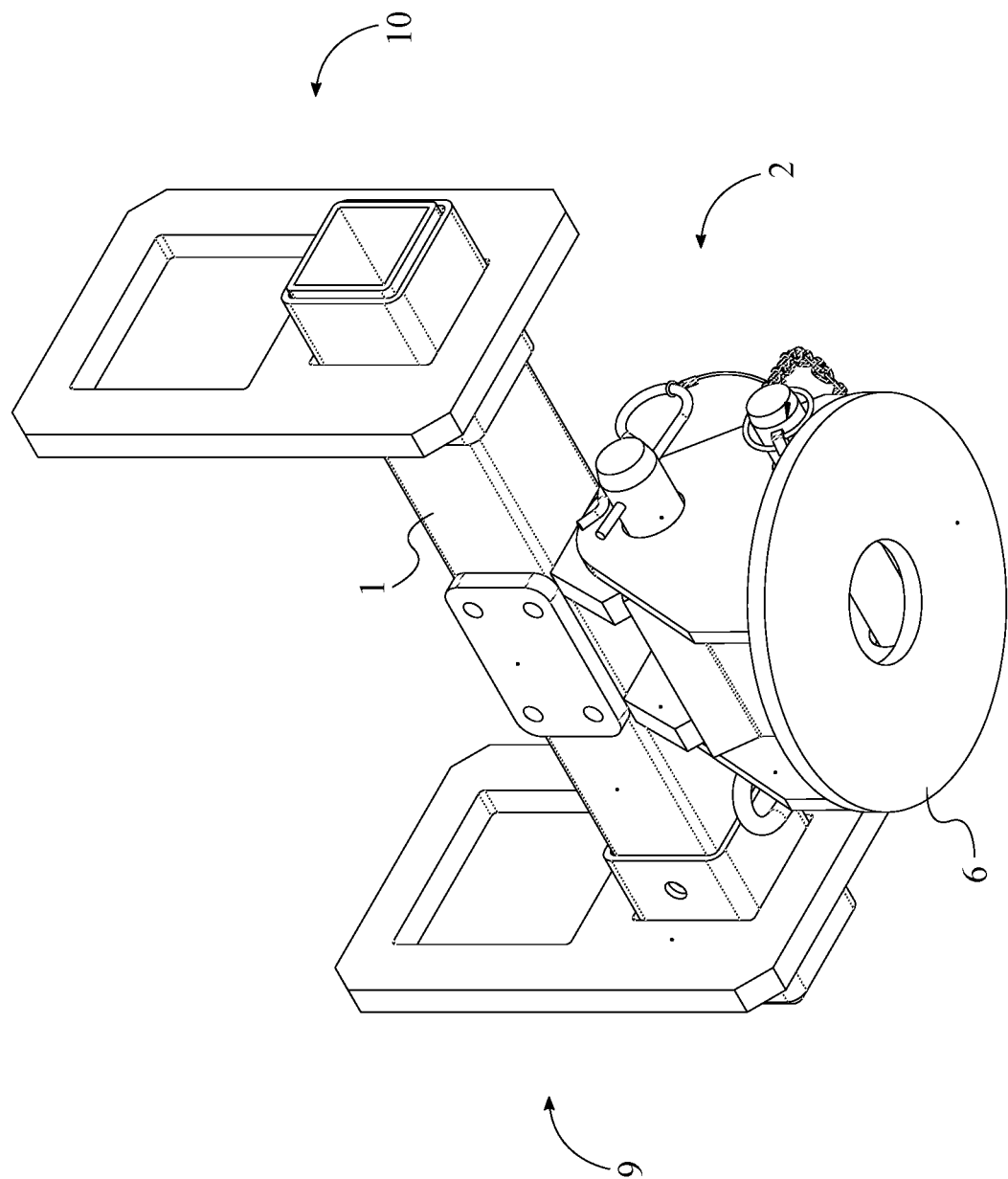
FIG. 7 is a bottom front perspective view of the present invention.

In order for the hitch attachment body 2 to allow the present invention to be attached to the hitch feature of a bobtail truck or other similar vehicle and with reference to FIGS. 1 and 2, the hitch attachment body 2 may further comprise an extension stump 3 and a hitch attachment feature 6. The extension stump 3 allows the hitch attachment body 2 to reach the hitch feature of a bobtail truck or other similar vehicle. The hitch attachment feature 6 allows the hitch attachment body 2 to be secured to the hitch feature of a bobtail truck or other similar vehicle. Further and with reference to FIGS. 1 and 7, the hitch attachment feature 6 may be any type of hitch coupler such as, but not limited to, a hitch kingpin coupler or a hitch ball mount coupler. The extension stump 3 comprises a proximal end 4 and a distal end 5. The proximal end 4 is laterally mounted to the tube 1, and the hitch attachment feature 6 is mounted onto the distal end 5. This arrangement positions the hitch attachment feature 6 at the furthest point from the tube 1 in order to reach and be secured to the hitch feature of a bobtail truck or other similar vehicle.

In order to prevent any damage between the present invention and a bobtail truck or other similar vehicle and with reference to FIGS. 1 and 2, the hitch attachment body 2 may further comprise a flange guard 7. The flange guard 7 allows the hitch attachment body 2 to be placed against the body of a bobtail truck or other similar vehicle without damaging the bobtail truck or other similar vehicle. The flange guard 7 is laterally connected around the distal end 5 and is positioned adjacent to the hitch attachment feature 6. This arrangement positions the flange guard 7 in order to prevent any damage to the bobtail truck or similar vehicle when the hitch attachment body 2 is secured to the bobtail truck or similar vehicle. This arrangement also allows the flange guard 7 to stabilize the present invention against the bobtail truck or similar vehicle when the hitch attachment body 2 is secured to the bobtail truck or similar vehicle.

In order for the hitch attachment body 2 to be effectively secured to the tube 1 when a pulling force is applied to a bobtail truck or similar vehicle and with reference to FIG. 1, the hitch attachment body 2 may further comprise a plurality of structural reinforcement ribs 8. The plurality of structural reinforcement ribs 8 is preferably a pair of gussets that reinforce the connection between the tube 1 and the hitch attachment body 2. The plurality of structural reinforcement ribs 8 is mounted along the extension stump 3 and is distributed about the extension stump 3. This arrangement provides additional structural integrity to the extension stump 3 while the present invention is bearing the load of being attached to a bobtail truck or similar vehicle. Moreover, the tube 1 is terminally connected to each of the plurality of structural reinforcement ribs 8. Thus, hitch attachment body 2 is effectively secured to the tube 1 at multiple connection points through the plurality of structural reinforcement ribs 8.

Although the invention has been explained in relation to its preferred embodiment, it is to be understood that many other possible modifications and variations can be made without departing from the spirit and scope of the invention as hereinafter claimed.

What is claimed is:

1. A towing attachment comprises:
   a tube;
   a hitch attachment body;
   a first mounting bracket;

a second mounting bracket;
a first locking mechanism;
a second locking mechanism;
the hitch attachment body comprises an extension stump, a hitch attachment feature, and a flange guard;
the extension stump comprises a proximal end and a distal end;
the hitch attachment body being laterally mounted to the tube;
the first mounting bracket and the second mounting bracket being laterally mounted to the tube;
the first mounting bracket and the second mounting bracket being positioned offset from each other along the tube;
the hitch attachment body being positioned in between the first mounting bracket and the second mounting bracket;
the hitch attachment body being oriented away from the first mounting bracket and the second mounting bracket about the tube;
the first locking mechanism being operatively coupled in between the first mounting bracket and the tube, wherein the first locking mechanism is used to selectively lock the first mounting bracket in place along the tube; and
the second locking mechanism being operatively coupled in between the second mounting bracket and the tube, wherein the second locking mechanism is used to selectively lock the second mounting bracket in place along the tube;
the proximal end being laterally mounted to the tube;
the hitch attachment feature being mounted onto the distal end;
the flange guard being laterally connected around the distal end; and
the flange guard being positioned adjacent to the hitch attachment feature.

2. The towing attachment as claimed in claim 1 comprises:
the first mounting bracket and the second mounting bracket each comprise a panel, a sleeve, and a lift-receiving feature;
the sleeve and the lift-receiving feature traversing through the panel;
the sleeve and the lift-receiving feature being positioned offset from each other across the panel;
the sleeve and the lift-receiving feature being positioned normal to the panel;
the tube being slidably mounted within the sleeve; and
the lift-receiving feature of the first mounting bracket and the lift-receiving feature of the second mounting bracket being concentrically positioned to each other.

3. The towing attachment as claimed in claim 2 comprises:
the first locking mechanism comprises a first bracket hole, a first tube hole, and a first pin;
the first bracket hole laterally traversing through the sleeve of the first mounting bracket;
the first tube hole laterally traversing through the tube;
the first bracket hole being concentrically positioned to the first tube hole; and
the first tube hole and the first bracket hole being engaged by the first pin.

4. The towing attachment as claimed in claim 2 comprises:
the second locking mechanism comprises a second bracket hole, a second tube hole, and a second pin;
the second bracket hole laterally traversing through the sleeve of the second mounting bracket;
the second tube hole laterally traversing through the tube;
the second bracket hole being concentrically positioned to the second tube hole; and
the second tube hole and the second bracket hole being engaged by the second pin.

5. The towing attachment as claimed in claim 1 comprises:
the hitch attachment body further comprises a plurality of structural reinforcement ribs;
the plurality of structural reinforcement ribs being mounted along the extension stump;
the plurality of structural reinforcement ribs being distributed about the extension stump; and
the tube being terminally connected to each of the plurality of structural reinforcement ribs.

6. A towing attachment comprises:
a tube;
a hitch attachment body;
a first mounting bracket;
a second mounting bracket;
a first locking mechanism;
a second locking mechanism;
the first mounting bracket and the second mounting bracket each comprise a panel, a sleeve, and a lift-receiving feature;
the hitch attachment body being laterally mounted to the tube;
the first mounting bracket and the second mounting bracket being laterally mounted to the tube;
the first mounting bracket and the second mounting bracket being positioned offset from each other along the tube;
the hitch attachment body being positioned in between the first mounting bracket and the second mounting bracket;
the hitch attachment body being oriented away from the first mounting bracket and the second mounting bracket about the tube;
the first locking mechanism being operatively coupled in between the first mounting bracket and the tube, wherein the first locking mechanism is used to selectively lock the first mounting bracket in place along the tube;
the second locking mechanism being operatively coupled in between the second mounting bracket and the tube, wherein the second locking mechanism is used to selectively lock the second mounting bracket in place along the tube;
the sleeve and the lift-receiving feature traversing through the panel;
the sleeve and the lift-receiving feature being positioned offset from each other across the panel;
the sleeve and the lift-receiving feature being positioned normal to the panel;
the tube being slidably mounted within the sleeve; and
the lift-receiving feature of the first mounting bracket and the lift-receiving feature of the second mounting bracket being concentrically positioned to each other.

7. The towing attachment as claimed in claim 6 comprises:
the first locking mechanism comprises a first bracket hole, a first tube hole, and a first pin;
the first bracket hole laterally traversing through the sleeve of the first mounting bracket;
the first tube hole laterally traversing through the tube;

the first bracket hole being concentrically positioned to the first tube hole; and the first tube hole and the first bracket hole being engaged by the first pin.

8. The towing attachment as claimed in claim 6 comprises:

the second locking mechanism comprises a second bracket hole, a second tube hole, and a second pin;

the second bracket hole laterally traversing through the sleeve of the second mounting bracket;

the second tube hole laterally traversing through the tube;

the second bracket hole being concentrically positioned to the second tube hole; and the second tube hole and the second bracket hole being engaged by the second pin.

9. The towing attachment as claimed in claim 6 comprises:

the hitch attachment body comprises an extension stump and a hitch attachment feature;

the extension stump comprises a proximal end and a distal end;

the proximal end being laterally mounted to the tube; and the hitch attachment feature being mounted onto the distal end.

10. The towing attachment as claimed in claim 9 comprises:

the hitch attachment body further comprises a flange guard;

the flange guard being laterally connected around the distal end; and the flange guard being positioned adjacent to the hitch attachment feature.

11. The towing attachment as claimed in claim 9 comprises:

the hitch attachment body further comprises a plurality of structural reinforcement ribs;

the plurality of structural reinforcement ribs being mounted along the extension stump;

the plurality of structural reinforcement ribs being distributed about the extension stump; and the tube being terminally connected to each of the plurality of structural reinforcement ribs.

12. A towing attachment comprises:

a tube;

a hitch attachment body;

a first mounting bracket;

a second mounting bracket;

a first locking mechanism;

a second locking mechanism;

the first mounting bracket and the second mounting bracket each comprise a panel, a sleeve, and a lift-receiving feature;

the hitch attachment body comprises an extension stump and a hitch attachment feature;

the hitch attachment body being laterally mounted to the tube;

the first mounting bracket and the second mounting bracket being laterally mounted to the tube;

the first mounting bracket and the second mounting bracket being positioned offset from each other along the tube;

the hitch attachment body being positioned in between the first mounting bracket and the second mounting bracket;

the hitch attachment body being oriented away from the first mounting bracket and the second mounting bracket about the tube;

the first locking mechanism being operatively coupled in between the first mounting bracket and the tube, wherein the first locking mechanism is used to selectively lock the first mounting bracket in place along the tube;

the second locking mechanism being operatively coupled in between the second mounting bracket and the tube, wherein the second locking mechanism is used to selectively lock the second mounting bracket in place along the tube;

the sleeve and the lift-receiving feature traversing through the panel;

the sleeve and the lift-receiving feature being positioned offset from each other across the panel;

the sleeve and the lift-receiving feature being positioned normal to the panel;

the tube being slidably mounted within the sleeve;

the lift-receiving feature of the first mounting bracket and the lift-receiving feature of the second mounting bracket being concentrically positioned to each other;

the extension stump comprises a proximal end and a distal end;

the proximal end being laterally mounted to the tube; and the hitch attachment feature being mounted onto the distal end.

13. The towing attachment as claimed in claim 12 comprises:

the first locking mechanism comprises a first bracket hole, a first tube hole, and a first pin;

the first bracket hole laterally traversing through the sleeve of the first mounting bracket;

the first tube hole laterally traversing through the tube;

the first bracket hole being concentrically positioned to the first tube hole; and the first tube hole and the first bracket hole being engaged by the first pin.

14. The towing attachment as claimed in claim 12 comprises:

the second locking mechanism comprises a second bracket hole, a second tube hole, and a second pin;

the second bracket hole laterally traversing through the sleeve of the second mounting bracket;

the second tube hole laterally traversing through the tube;

the second bracket hole being concentrically positioned to the second tube hole; and the second tube hole and the second bracket hole being engaged by the second pin.

15. The towing attachment as claimed in claim 12 comprises:

the hitch attachment body further comprises a flange guard;

the flange guard being laterally connected around the distal end; and the flange guard being positioned adjacent to the hitch attachment feature.

16. The towing attachment as claimed in claim 12 comprises:

the hitch attachment body further comprises a plurality of structural reinforcement ribs;

the plurality of structural reinforcement ribs being mounted along the extension stump;

the plurality of structural reinforcement ribs being distributed about the extension stump; and the tube being terminally connected to each of the plurality of structural reinforcement ribs.

* * * * *